United States Patent [19]

Wright, deceased

[11] 4,243,273

[45] Jan. 6, 1981

[54] ADJUSTABLE VARIABLE LOAD VALVE DEVICE

[75] Inventor: Raymond C. Wright, deceased, late of Irwin, Pa., by Helen A. Wright, executrix

[73] Assignee: American Standard Inc., Wilmerding, Pa.

[21] Appl. No.: 50,045

[22] Filed: Jun. 19, 1979

[51] Int. Cl.³ .............................................. B60T 8/22
[52] U.S. Cl. ................................................. 303/22 A
[58] Field of Search ........... 188/195; 303/22 A, 22 R, 303/23 A, 23 R

[56] References Cited

U.S. PATENT DOCUMENTS

| | | | |
|---|---|---|---|
| 2,940,796 | 6/1960 | Ortmann et al. | 303/22 A |
| 3,881,784 | 5/1975 | Engle | 303/22 A |
| 4,077,676 | 3/1978 | Hata | 303/22 A |

Primary Examiner—Duane A. Reger
Attorney, Agent, or Firm—R. S. Visk; R. W. McIntire, Jr.

[57] ABSTRACT

A variable load valve device having a fulcrumed lever, the opposite sides of which are acted upon by respective piston stems of opposing piston assemblies subject to air spring pressure and brake cylinder pressure, respectively. Each piston assembly is independently and axially positionally adjustable relative to the lever to vary the effective differential forces which dictate the level at which brake cylinder pressure is cut off to limit the maximum desired brake cylinder pressure for any given air spring pressure. The desired position adjustments of the piston assemblies are made by adjusting screws engaging the respective piston assemblies which require no changes in spring size or piston dimensions.

8 Claims, 4 Drawing Figures

ADJUSTABLE VARIABLE LOAD VALVE DEVICE

BACKGROUND OF THE INVENTION

Presently known variable load valve devices used primarily with mass transit vehicles are, in effect, pressure-limiting valve devices whose brake cylinder pressure cut-off valve is varied in accordance with changes in air spring pressure as effected by different vehicle load conditions. Since the requirements and operating characteristics vary among different brake systems of different mass transit vehicles, means must be provided to modify the several variable load valve devices to adapt to the different mass transit brake systems so as to effect the desired cut-off pressure valve and load/brake pressure ratio. This result is accomplished in the presently known devices by changing the springs and pistons thereof to those of appropriate sizes that will produce the desired effects, a process that is time consuming and costly.

SUMMARY OF THE INVENTION

The object of the present invention, therefore, is to provide a variable load valve device, primarily for rapid transit vehicles, having means for varying the ratio of brake cylinder pressure to air spring pressure in order to obtain desired brake cylinder pressure commensurate with any given air spring pressure as determined by vehicle load without having to change the size of springs or dimensions of pistons.

Briefly, the invention comprises an adjustable variable load valve device having a first piston assembly subject to brake cylinder pressure and operable for effecting supply of such pressure to the brake cylinder, a second piston assembly subject to air spring pressure, a fulcrumed lever member operably interposed between said first piston assembly and said second piston assembly and acted upon opposite sides thereof, intermediate its ends, by respective opposingly disposed piston stems of the first and second piston assemblies, respectively, for coordinating the ratio of brake cylinder pressure to air spring pressure according to vehicle load, said first piston assembly and said second piston assembly being independently positionally adjustable axially relative and parallel to the lever member for varying the respective points on said lever at which the respective piston stems act thereon for adjusting the brake cylinder/air spring pressure ratio according to the requirements of the particular vehicle on which the valve device is employed.

Adjustable spring means, associated with the piston assembly subjected to air spring pressure, provides for a predetermined minimum braking effect in the event of air spring pressure failure. Second spring means is adjustable for exerting a preselected force on the free end of the fulcrumed lever for varying the range of minimum and maximum brake cylinder to air spring pressure ratio.

DESCRIPTION AND OPERATION

Figure 1:
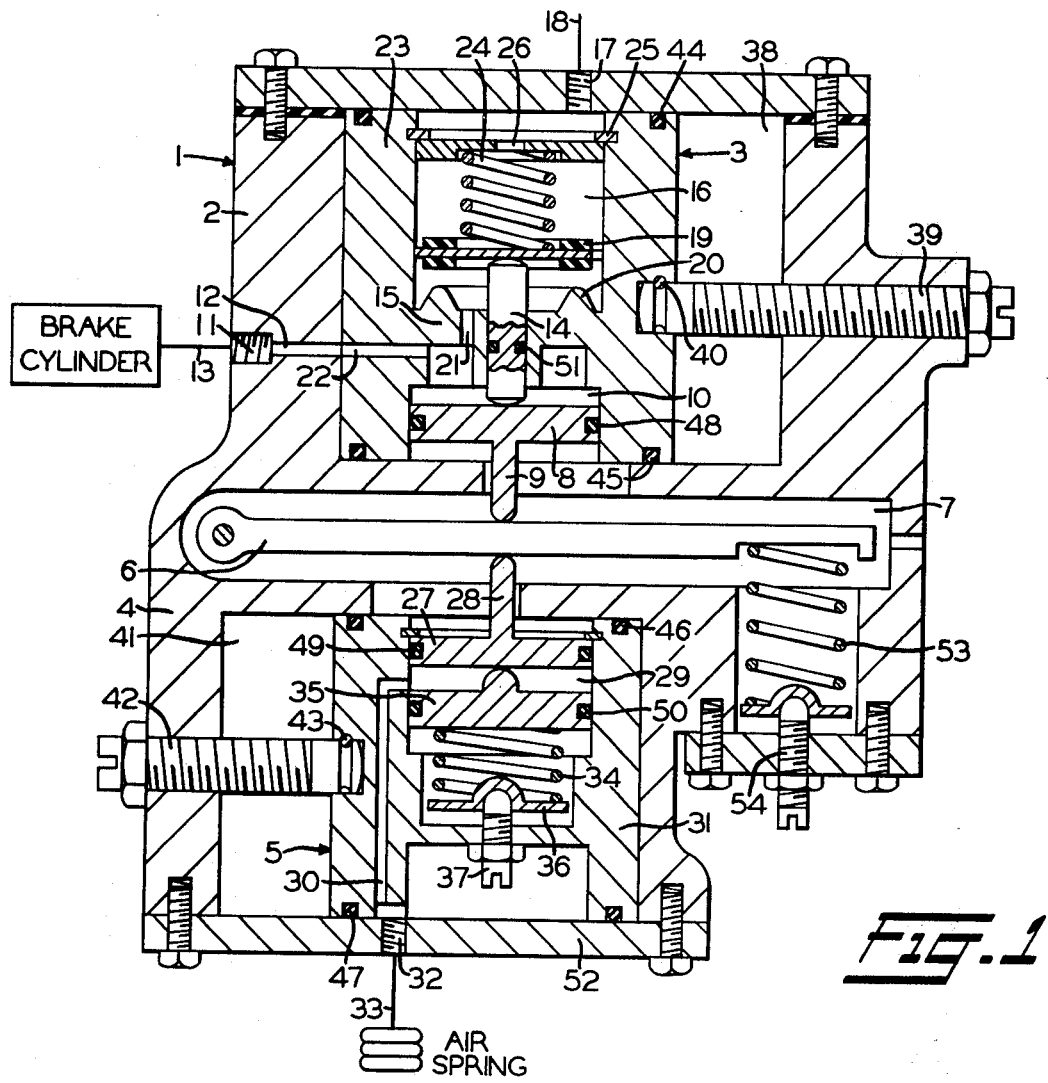
FIG. 1 is an elevational view, in section, of the variable load valve embodying the invention.

As shown in FIG. 1, a variable load valve device comprises a casing 1 having an upper casing portion 2 in which a piston valve assembly 3, controlled by brake cylinder pressure, is disposed, and a lower casing portion 4 in which a control piston assembly 5, controlled by air spring pressure, is disposed.

According to the invention, a fulcrum lever 6, having one end pivotally anchored to casing 1, is operably disposed perpendicularly to and between the piston assemblies 3 and 5 in an atmospheric chamber 7.

Piston-valve assembly 3 comprises a piston 8 subjected on a lower side to atmospheric pressure in atmospheric chamber 7 adjacent thereto and has a piston stem 9 extending concentrically from said lower side to make contact with one side of fulcrum lever 6. The opposite or upper side of piston 8 is subjected to prevailing brake cylinder pressure in an equalizing chamber 10 communicating with a brake cylinder pressure delivery port 11 and passageway 12, both formed in upper casing portion 2 and via which operating fluid pressure is supplied, via a pipe 13, to a brake cylinder.

The upper side of piston 8 makes abutting contact with the lower end of an operating stem 14 extending axially therefrom and sealingly slidingly through a separating wall 15 formed integrally with upper casing portion 2 and separating equalizing chamber 10 from a supply chamber 16 communicating with a pressure supply port 17. Supply port 17 is connected via a pipe 18 to a source of fluid pressure such as a main reservoir (not shown). The upper end of operating stem 14 makes abutting contact with a disc-type valve member 19, also comprising part of piston-valve assembly 3, for effecting operation thereof to an open or unseated position relative to a valve seat 20 formed on the upper side of separating wall 15. In the unseated position of valve member 19, supply port 17 is communicated with delivery port 11 past unseated valve 19, via a passageway 21 through separating wall 15, a passageway 22 formed in piston-valve assembly carriage 23, and passageway 12 with which said passageway 22 aligns.

Valve member 19 is biased into abutting contact with the upper end of operating stem 14 by a spring 24 compressed between said valve member and a valve seat 25 fixed in the upper end of supply chamber 16. Valve seat 25 is provided with an opening 26 through which fluid pressure may freely flow.

Control piston assembly 5 comprises a control piston 27 subjected on an upper side to atmospheric pressure in atmospheric chamber 7 adjacent thereto and has a piston stem 28 extending concentrically from said upper side to make contact with the side of fulcrum lever 6 opposite stem 9. The opposite or lower side of piston 27 is subjected to prevailing air spring pressure in a control chamber 29 communicating with vehicle air springs via a passageway 3 formed in a control piston assembly carriage 31 and an air spring pressure port 32 formed in lower casing portion 4 and connected to the air springs via a pipe 33. The lower side of control piston 27 is also subjected to the force of a compressibly adjustable minimum brake pressure spring 34 acting through an upper movable spring seat 35 making abutting contact with said lower side of the control piston, said spring being compressibly adjustable between said upper spring seat and a lower spring seat 36 positionally axially adjustable by an adjusting screw 37.

In order to vary the axial position at which piston stem 9 of supply piston 8 makes contact with the upper side of fulcrum lever 6, piston-valve assembly 3 is disposed in a recess 38 in upper casing portion 2 and is axially positionally adjustable therein relative and parallel to said fulcrum lever by an adjusting screw 39 screw-threadedly movable in said housing portion and having the inner end thereof freely rotatably secured in an adjacent side wall of piston assembly carriage 23, the rotation of said inner end being accommodated by a roll pin 40 engaging an annular groove surrounding said inner end.

So that the axial position at which piston stem 28 of control piston 27 makes contact with the lower side of fulcrum lever 6 may be varied, second piston assembly 5 and piston assembly carriage 31 are arranged in a recess 41 in lever casing portion 4 in similar fashion as first piston assembly 3 and carriage 23 are arranged, as above described. An adjusting screw 42 and roll pin 43 are associated with second piston assembly 5 for effecting positional adjustment thereof.

When piston-valve assembly 3 is in a leftward-most position and control piston assembly 5 is in a rightward-most position, in which they are respectively shown in the drawing, stems 9 and 28 are positioned directly opposite each other to exert opposing forces at substantially the midpoint of lever 6.

Sealing O-rings 44 and 45, 46 and 47 are provided at the upper and lower ends of piston assembly carriages 23 and 31, respectively, 48 and 49 on supply and control pistons 8 and 27, respectively, 50 on movable spring seat 35, and 51 on operating stem 14 to prevent leakage of fluid pressure past the several specified locations.

Figure 2:
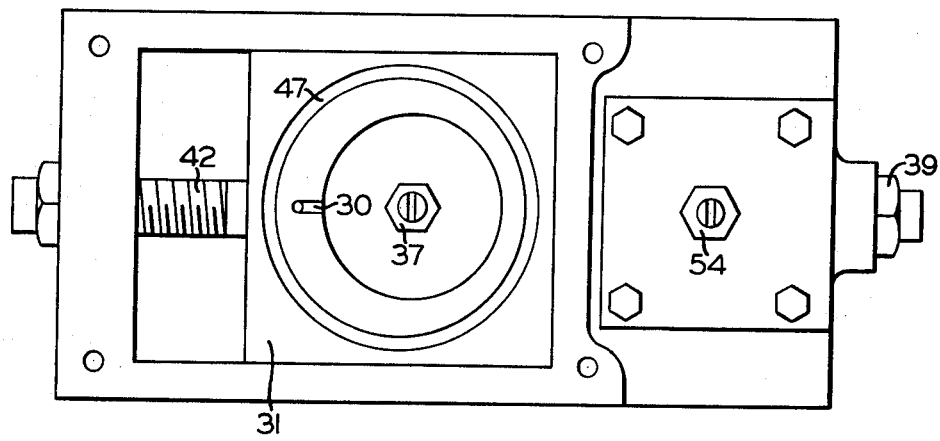
FIG. 2 shows a view of the valve from the underside

FIG. 2 is a bottom view of FIG. 1 with a bottom casing cover 52 removed. The O-ring 47 may be seen disposed in a groove formed on the bottom surface of piston assembly carriage 31, which, as noted, has a square cross-sectional shape. Piston assembly carriage 23 in upper casing portion 2 is similarly shaped.

Assuming, in operation of the variable load valve device, that initially supply valve 19 is seated on valve seat 20 so that communication between supply port 17 and delivery port 13 is cut off. When air spring pressure attains a value commensurate with the prevailing vehicle load, such pressure reaches control chamber 29 via pipe 33, port 32 and passageway 30 to act on the lower side of control piston 27 for effecting upward movement of the piston and stem 28 which, in turn, causes counterclockwise rotation of fulcrum lever 6 about its fixed end. Fulcrum lever 6, acting on stem 9 of supply piston 8, causes said supply piston, along with operating stem 14, to be moved upwardly, thereby unseating valve member 19 to communicate supply port 17 with delivery port 11.

If a brake application is initiated, brake cylinder actuating pressure is routed via pipe 18, supply port 17, through opening 26 in spring seat 25, past unseated valve 19, via passageways 21, 22, and 12, delivery port 11, and pipe 13 to the brake cylinder. Actuating pressure also flows into equalizing chamber 10 to act on the upper side of supply piston 8. When the downwardly-acting force of pressure acting on the upper side of supply piston 8 attains a value sufficient for balancing the opposing upwardly-acting force on said supply piston as provided by air spring pressure acting on the lower side of control piston 27 and acting through stem 28, lever 6, and stem 9, said supply piston 8, lever 6, and control piston 27 all move downwardly in unison to allow spring 24 to reseat valve member 19 and thereby cut off further supply of pressure to the brake cylinders. Thus, the pressure supplied to the brake cylinders is determined by air spring pressure and the respective positions of stems 9 and 28 on lever 6. As shown, with stems directly opposite each other, the ratio is 1:1 since the moment arms of lever 6 are equal.

Figure 3:
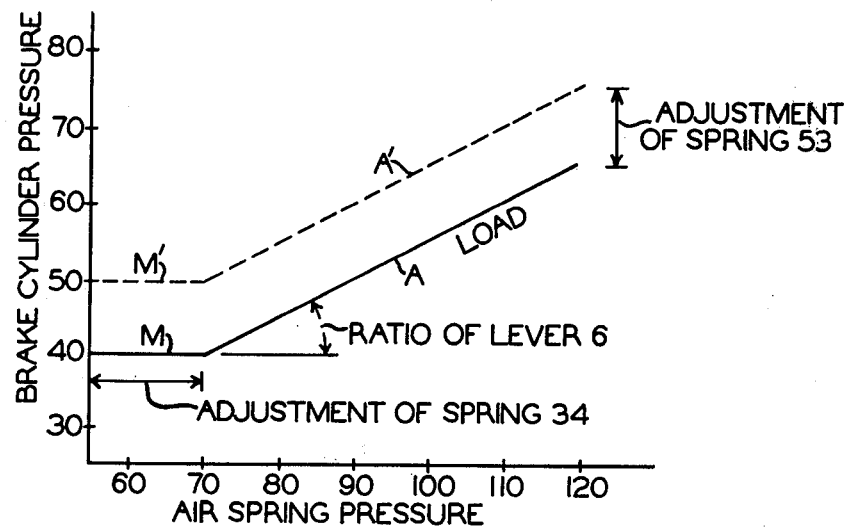
FIGS. 3 and 4 show a pair of graphs representing the relationship in ratio form between brake cylinder pressure and air spring pressure in two different ranges.
Figure 4:
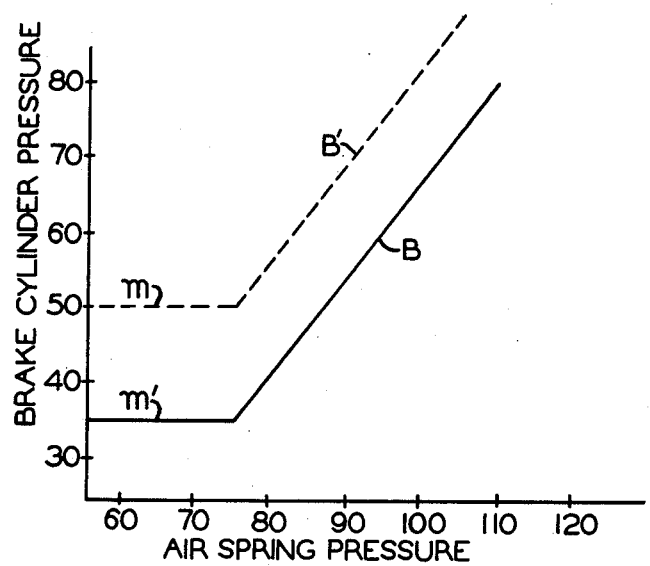

The ratio of air spring pressure to brake cylinder pressure, which is represented by graphs I and II in FIG. 3, may be varied by adjusting the axial positions of piston assemblies 3 and 5 relative to lever 6. Thus, for certain axial positions of piston assemblies 3 and 5, the resulting ratio is represented by curve A in graph I. If it is desired to increase the slope of curve A so that a higher brake cylinder pressure is attained with a given air spring pressure, piston-valve assembly 3 is moved rightwardly by adjusting screw 39, or control assembly 5 is moved leftwardly so that for a given air spring pressure, a higher brake cylinder pressure is necessary to overcome the effect of the increased clockwise moment arm and the decreased counterclockwise moment arm of lever 6. The character of this brake cylinder to air spring ratio is represented by curve B in graph II of FIG. 3.

Note that in graph I, for example, a 90 psi air spring pressure effects approximately a 50 psi brake cylinder pressure. Subsequent to positional adjustment of piston assemblies 3 and 5, as above described, a 90 psi air spring pressure effects delivery of approximately a 55 psi. brake cylinder pressure, as illustrated in graph II. Thus, it is possible to attain numerous brake cylinder to air spring pressure ratios with the device herein disclosed and described to accommodate all types of railway vehicles of various braking requirements without substituting springs of different values and pistons of different dimensions.

A compressibly adjustable pressure range spring 53 is disposed in lower casing portion 4 directly beneath the free end of lever 6 to exert an upwardly directed force on said free end as determined by the adjusted compression of said spring set by an adjusting screw 54. It should be apparent that by increasing the compression of spring 13, the force thereof acting upwardly on lever 6 requires a greater brake cylinder pressure to counteract said increased force exerted by the spring, therefore effecting higher brake cylinder pressure. Curve A' shown in broken line in graph I, and curve B' shown in broken line in graph II represent the effect of additional compressive force exerted by spring 13.

In order to provide a minimum braking effort in the event of total loss of air spring pressure, spring 34 is provided so as to provide a certain minimum force acting on the underside of control piston 27 through spring seat 35. Depending upon the compressive adjustment of spring 34, this upwardly directed force combined with the upwardly directed force exerted by spring 53 determine a minimum brake cylinder pressure which is represented in graphs I and II by M and M' and m and m', respectively.

Having now described the invention what I claim as new and desire to secure by Letters Patent, is:

1. An adjustable variable load valve device for use in a railway vehicle having a brake cylinder and air springs, said load valve device comprising:
   (a) a casing having an upper casing portion and a lower casing portion;
   (b) a fulcrum lever operably disposed in said casing between said upper and lower casing portions with one end pivotally anchored to the casing and having its other end free;

(c) piston-valve means operably disposed in said upper casing portion for controlling supply and cut-off of actuating fluid pressure to and from the brake cylinder and for exerting a downwardly-directed force at a preselected contact point on an upper side of said fulcrum lever commensurate with the pressure of said actuating pressure; and (d) control piston means operably disposed in said lower casing portion and subjected to prevailing air spring pressure for exerting an upwardly directed force at a preselected contact point on a lower side of said fulcrum lever commensurate with said air spring pressure, the two forces thus establishing a brake cylinder pressure to air spring pressure ratio in accordance with moment arms determined by the two contact points on the fulcrum lever at which the respective forces act, (e) said piston-valve means and said control piston means being axially positionally adjustable relative and parallel to said fulcrum lever for varying the respective contact points and consequently the brake cylinder pressure to air spring pressure accordingly.

2. An adjustable variable load valve device, as set forth in claim 1, wherein said piston-valve means comprises a valve member having a normally open position in which actuating pressure is supplied to the brake cylinder, and being operable to a closed position in which such supply of actuating pressure is cut off and a supply piston subjected to said actuating pressure for exerting said downwardly directed force, and wherein said control piston means comprises a control piston subjected to prevailing air spring pressure for exerting said upwardly directed force.

3. An adjustable variable load valve device, as set forth in claim 2, wherein said supply piston and said control piston are each provided with a piston stem extending therefrom to make contact with the fulcrum lever and transmit the respective forces thereto.

4. An adjustable variable load valve device, as set forth in claim 2, wherein said piston-valve means further comprises a biasing spring biasing said valve member toward said closed position, said biasing being effective, when said downwardly directed force is equal to or greater than said upwardly directed force.

5. An adjustable variable load valve device, as set forth in claim 1, further comprising pressure range spring means acting in an upwardly direction on said free end of the fulcrum lever and being compressibly adjustable for varying the range of the brake cylinder pressure to air spring pressure ratio without varying the established moment arms of the fulcrum lever.

6. An adjustable variable load valve device, as set forth in claim 2, further comprising a compressibly adjustable minimum brake pressure spring acting in an upwardly direction on said control piston independently of air spring pressure for exerting an upwardly directed force thereon according to the adjusted compression of the spring to ensure a minimum brake cylinder pressure in the event of failure of air spring pressure.

7. An adjustable variable load valve device, as set forth in claim 2, further comprising a piston-valve assembly carriage in which said valve member and said supply piston are operably disposed and axially positionally adjustable therewith as a unit, and a control piston assembly carriage in which said control piston in operably disposed and axially positionally adjustable therewith as a unit.

8. An adjustable variable load valve device, as set forth in claim 7, further comprising respective adjusting screws for positionally adjusting said piston-valve carriage and said control piston assembly, each of said adjusting screws having one end freely rotatably engaging the respective carriage and the other end screw-threadedly disposed in said upper and lower casing portions, respectively, for effecting axial movement of the respective carriages upon rotation of the adjusting screws.

* * * * *